(12) United States Patent
Shi et al.

(10) Patent No.: US 11,327,887 B2
(45) Date of Patent: *May 10, 2022

(54) SERVER-SIDE EXTENSION OF CLIENT-SIDE CACHES

(71) Applicant: Oracle International Corporation, Redwood Shores, CA (US)

(72) Inventors: Jia Shi, Burlingame, CA (US); Wei Zhang, Foster City, CA (US); Kothanda Umamageswaran, Sunnyvale, CA (US); Neil J. S. MacNaughton, Los Gatos, CA (US); Vijayakrishnan Nagarajan, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 15/705,166

(22) Filed: Sep. 14, 2017

(65) Prior Publication Data
US 2019/0079864 A1    Mar. 14, 2019

(51) Int. Cl.
*G06F 15/167*    (2006.01)
*G06F 12/0808*    (2016.01)
(Continued)

(52) U.S. Cl.
CPC .......... *G06F 12/0808* (2013.01); *G06F 13/28* (2013.01); *G06F 16/10* (2019.01);
(Continued)

(58) Field of Classification Search
CPC ............... G06F 12/084; G06F 12/0866; G06F 12/0811; G06F 12/0888; G06F 12/0246;
(Continued)

(56) References Cited

U.S. PATENT DOCUMENTS 5,897,634 A    4/1999 Attaluri et al.
6,078,994 A    6/2000 Carey
(Continued)

FOREIGN PATENT DOCUMENTS

EP        2 842 040 A1    3/2015
KR   10-2010-0131054     12/2010

OTHER PUBLICATIONS

U.S. Appl. No. 13/037,172, filed Feb. 28, 2011, Final Office Action, dated Mar. 29, 2016.
(Continued)

*Primary Examiner* — Farzana B Huq
(74) *Attorney, Agent, or Firm* — Hickman Becker Bingham Ledesma LLP

(57) ABSTRACT

Techniques related to a server-side extension of client-side caches are provided. A storage server computer receives, from a database server computer, an eviction notification indicating that a data block has been evicted from the database server computer's cache. The storage server computer comprises a memory hierarchy including a volatile cache and a persistent cache. Upon receiving the eviction notification, the storage server computer retrieves the data block from the persistent cache and stores it in the volatile cache. When the storage server computer receives, from the database server computer, a request for the data block, the storage server computer retrieves the data block from the volatile cache. Furthermore, the storage server computer sends the data block to the database server computer, thereby causing the data block to be stored in the database server computer's cache. Still further, the storage server computer evicts the data block from the volatile cache.

18 Claims, 9 Drawing Sheets

(51) Int. Cl.
　　　*G06F 13/28* (2006.01)
　　　*G06F 16/10* (2019.01)
　　　*G06F 16/172* (2019.01)
(52) U.S. Cl.
　　　CPC ...... *G06F 16/172* (2019.01); *G06F 2212/154* (2013.01); *G06F 2212/60* (2013.01)
(58) Field of Classification Search
　　　CPC ............. H04L 67/1031; H04L 67/1065; H04L 67/1097; H04L 67/2814; H04L 67/2842; H04L 29/08
　　　USPC ........ 709/212, 245, 202, 217–219, 203–204, 709/206, 223–227
　　　See application file for complete search history.

(56) References Cited

U.S. PATENT DOCUMENTS

| | | | |
|---|---|---|---|
| 6,434,672 | B1 | 8/2002 | Gaither |
| 6,557,082 | B1 | 4/2003 | Josten et al. |
| 6,633,891 | B1 | 10/2003 | Bamford et al. |
| 6,851,024 | B1* | 2/2005 | Wilkes ................ G06F 12/0866 711/122 |
| 7,581,064 | B1 | 8/2009 | Zedlewski |
| 7,822,727 | B1 | 10/2010 | Shaughnessy |
| 7,840,752 | B2 | 11/2010 | Hu et al. |
| 8,489,820 | B1* | 7/2013 | Ellard ................ G06F 12/0246 711/138 |
| 9,703,706 | B2 | 7/2017 | Bagal et al. |
| 2002/0026448 | A1 | 2/2002 | Bird et al. |
| 2002/0052914 | A1 | 5/2002 | Zalewski et al. |
| 2004/0215883 | A1 | 10/2004 | Bamford et al. |
| 2005/0193160 | A1 | 9/2005 | Bhatt et al. |
| 2005/0204112 | A1 | 9/2005 | O'Connor et al. |
| 2005/0223174 | A1 | 10/2005 | Mogi |
| 2006/0143256 | A1 | 6/2006 | Galchev |
| 2006/0248131 | A1 | 11/2006 | Marwinski et al. |
| 2007/0260922 | A1* | 11/2007 | Cao .................... G06F 11/1666 714/24 |
| 2009/0070337 | A1* | 3/2009 | Romem ........... G06F 16/24539 |
| 2009/0164733 | A1 | 6/2009 | Kim et al. |
| 2009/0276654 | A1 | 11/2009 | Butterworth et al. |
| 2010/0122026 | A1* | 5/2010 | Umamageswaran ....................... G06F 16/24552 711/113 |
| 2010/0161912 | A1 | 6/2010 | Daniel |
| 2010/0185817 | A1 | 7/2010 | Magenheimer |
| 2011/0113036 | A1 | 5/2011 | Idicula et al. |
| 2011/0238746 | A1* | 9/2011 | Chess ................ G06F 16/9574 709/203 |
| 2012/0005158 | A1 | 1/2012 | Bhatt et al. |
| 2012/0221768 | A1 | 8/2012 | Bagal et al. |
| 2013/0339572 | A1 | 12/2013 | Fanning et al. |
| 2014/0324785 | A1 | 10/2014 | Gupta et al. |
| 2014/0359063 | A1* | 12/2014 | Kondo ................ H04L 67/2852 709/217 |
| 2015/0212744 | A1 | 7/2015 | Helman et al. |
| 2017/0300427 | A1 | 10/2017 | Lin |
| 2017/0308470 | A1 | 10/2017 | Bagal et al. |
| 2018/0004661 | A1 | 1/2018 | Umehara |
| 2018/0011893 | A1 | 1/2018 | Kimura |
| 2018/0267898 | A1 | 9/2018 | Henry |
| 2018/0336143 | A1 | 11/2018 | Lai |
| 2020/0104259 | A1 | 4/2020 | Wang |
| 2020/0110700 | A1 | 4/2020 | Shi |

OTHER PUBLICATIONS

Bagal, U.S. Appl. No. 13/037,172, filed Feb. 28, 2011, Notice of Allowance, dated Mar. 1, 2017.
Bagal, U.S. Appl. No. 13/037,172, filed Feb. 28, 2011, Office Action, dated Jan. 7, 2013.
Bagal, U.S. Appl. No. 13/037,172, filed Feb. 28, 2011, Office Action, dated May 23, 2013.
Bagal, U.S. Appl. No. 13/037,172, filed on Feb. 28, 2011, Notice of Allowance, dated Mar. 1, 2017.
Bagal, U.S. Appl. No. 13/037,172, filed Feb. 28, 2011, Office Action, dated Nov. 9, 2016.
Bagal, U.S. Appl. No. 15/645,794, filed Jul. 10, 2017, Notice of Allowance, dated Jun. 5, 2018.
Bagal, U.S. Appl. No. 13/037,172, filed Feb. 28, 2011, Final Office Action, dated Sep. 16, 2013.
U.S. Appl. No. 13/037,172, filed Feb. 28, 2011, Advisory Action, dated Jul. 12, 2016.
U.S. Appl. No. 13/037,172, filed Feb. 28, 2011, Office Action, dated Nov. 5, 2015.
U.S. Appl. No. 13/037,172, filed Feb. 28, 2011, Final Office Action, dated Apr. 16, 2015.
U.S. Appl. No. 13/037,172, filed Feb. 28, 2011, Final Office Action, dated Sep. 16, 2013.
U.S. Appl. No. 13/037,172, filed Feb. 28, 2011, Interview Summary, dated Jul. 5, 2016.
U.S. Appl. No. 13/037,172, filed Feb. 28, 2011, Interview Summary, dated Nov. 9, 2016.
U.S. Appl. No. 13/037,172, filed Feb. 28, 2011, Office Action, dated Jan. 7, 2013.
U.S. Appl. No. 13/037,172, filed Feb. 28, 2011, Office Action, dated May 23, 2013.
U.S. Appl. No. 13/037,172, filed Feb. 28, 2011, Office Action, dated Nov. 6, 2014.
Bagal, U.S. Appl. No. 15/645,794, filed Jul. 10, 2017, Office Action, dated Jan. 26, 2018.
Yadgar et al., "Karma: Know it All Replacement for a Multilevel Cache", dated Jan. 1, 2007, 16 pages.
Wong, Theodore M., and Wilkes, John, "My cache or yours? Making storage more exclusive." Jun. 2002. USENIX. FAST '02.
Venkatarman, Shivakumar, Global Memory Management for Multi-Server Database Systems. 1996. University of Wisconsin—Madison. pp. 24-32.
Soundararajan, Gokul et al., "Dynamic Partitioning of the Cache Hierarchy in Shared Data Centers." Aug. 2008. ACM. '08. pp. 635-646.
Rik Van Riel "Page replacement in Linux 2.4 memory management." Jun. 2001. USENIX; FREENIX 2001.
Peetz, Andreas, "A Myth Busted and an FAQ: ESXi is *not* Based on Linux! But what is it?", dated Aug. 2013, http://www.vfront.de/2013/08a-myth-busted-and-faqe-sxi-is-not based.html.
Liu, Xin et al. "CLIC: Client-Informed Caching for Storage Servers." Feb. 2009. USENIX. FAST '09. pp. 297-310.
Koltsidas, Ioannis and Vigias, Stratis D., "The Case For Flash-Aware Multi-Level Caching." 2009. University of Edinburgh. Tech Report EDI-INF-RR-1319.
Jung, Hoyoung et al. "LRU-WSR: Integration of LRU and Write Sequence Reordering for Flash Memory." Aug. 2008. IEEE. IEEE Transactions on Consumer Electronics. vol. 54. pp. 1215-1223.
Hennessy, John L., and Patterson, David A., Computer Architecture: A Quantitative Approach. 2007; Elsevier. 4th ed. pp. 287-315.
Culler et al., "Parallel Computer Architecture", dated Aug. 1997, Morgan Kaufmann, pp. 263-290, dated 1997.
Chandrasekaran, Sashikanth and Bamford, Roger, "Shared Cache—The Future of Parallel Databases." Mar. 2003. ICDE'03. pp. 840-850.
"In the Lab: Full ESX/vMotion Test Lab in a Box, Part 2", dated Aug. 2009, https://blog.solori.net/2009/08/17/in-the-lab-full-escmotion-test-lab-in-a-box-part-2/.
"In the Lab: Full ESX/vMotion Test Lab in a Box, Part 1", dated Aug. 2009, https://blog.solori.net/2009/08/17/in-the-lab-full-escmotion-test-lab-in-a-box-part-1/.
Bagal et al., U.S. Appl. No. 16/153,610, filed Oct. 5, 2018, Final Office Action dated Apr. 2, 2021.
McObject's "NextPoint Integrates McObject's eXtreme DB Embedded Database to Support Real-time Applications for SBC and MSX Platforms", dated Mar. 2008, 3 pages.
Bagal, U.S. Appl. No. 16/153,610, filed Oct. 5, 2018, Pre-Brief Appeal Conference decision, dated Aug. 16, 2021.
Bagal, U.S. Appl. No. 16/153,610, filed Oct. 5, 2018, Office Action, dated Mar. 9, 2020.

(56) References Cited

OTHER PUBLICATIONS

Shi, U.S. Appl. No. 16/153,674, filed Oct. 5, 2018, Notice of Allowance, dated Jun. 29, 2020.
Bagal, U.S. Appl. No. 16/153,610, filed Oct. 5, 2018, Final Office Action, dated Jun. 23, 2020.

* cited by examiner

SERVER-SIDE EXTENSION OF CLIENT-SIDE CACHES

TECHNICAL FIELD

Embodiments are generally related to information storage and retrieval technology. More specifically, embodiments are related to a server-side extension of client-side caches.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Clustered Databases

A clustered database environment provides many advantages, such as fault tolerance and load balancing. Some clustered database environments have a shared-everything or a shared-disk architecture. Referring to FIG. 1, database server computers 100-102 concurrently access or "share" storage server computer 104 and collectively implement server-side functions of a database management system (DBMS). Conceptually, database server computers 100-102 operate as front-end servers, and storage server computer 104 operate as a back-end server. For ease of reference, the front-end and back-end are hereinafter referred to as the database-side and the storage-side, respectively. Although the clustered database environment of FIG. 1 only depicts two database server computers, it should be appreciated that a clustered database environment may comprise any number of database server computers.

Each database server computer 100, 102 is a compute node that runs one or more instances of a database server. Each database server instance is a collection of memory and processes that interact with storage server computer 104 to access memory locations therein. Storage server computer 104 exhibits a server-client relationship with each database server computer 100, 102. For example, database server computer 100, 102 may request data from storage server computer 104, and in response, storage server computer 104 may return requested data to database server computer 100, 102. Thus, from the perspective of storage server computer 104, the database-side and the storage-side can also be referred to as the client-side and the server-side.

Storage server computer 104 may include persistent storage 112 and/or may be communicatively coupled to an external device that includes persistent storage 112. Persistent storage 112 may comprise one or more storage devices that retain data in the absence of any electrical power. For example, persistent storage 112 may include one or more magnetic storage disks. Persistent storage 112 may be used as a data store that backs a plurality of caches, such as database server caches 106-108 and persistent cache 110. Desired data may be absent from the plurality of caches for various reasons, such as cache misses or hardware failures. However, when desired data is absent from the plurality of caches, storage server computer 104 may retrieve a copy of the data from persistent storage 112.

Data may be stored in logical structures referred to herein as "data blocks". Each data block corresponds to a particular number of bytes of physical storage space. For example, each data block may correspond to two kilobytes of disk space. To be clear, however, data may be stored as data blocks in a cache as well as in persistent storage 112. In fact, cached data blocks may be categorized as "clean" or "dirty". A "clean" data block is a copy of a data block that is the same version of the data block stored in persistent storage 112. In other words, a "clean" data block has not been modified after being cached. In contrast, a "dirty" data block is a copy of a data block that is a different version of the data block stored in persistent storage 112. For example, a "dirty" data block may have been modified in a database server cache 106, 108. For the sake of clarity and ease of explanation, the terms "data" and "data block" are used herein to refer to data or a data block as well as copies of the data or the data block.

Database Server Caches

Database systems implement database-side caches. In the example of FIG. 1, database server computers 100-102 comprise caches 106-108, respectively. Each database-side cache 106, 108 may be all or part of a volatile memory of a database server computer 100, 102. Examples of volatile memory include random-access memory (RAM), main memory, and/or the like.

In general, performing input/output (I/O) operations in volatile memory is faster than performing I/O operations in non-volatile memory, such as persistent storage 112. One reason is that volatile memory is a lower-latency storage medium relative to non-volatile memory. For example, performing I/O operations in RAM may avoid costlier disk I/O operations, seek times, and/or the like. Another reason is that volatile memory is typically in closer proximity to processors than is non-volatile memory. For example, RAM can be on-chip or chip-adjacent, whereas a hard disk drive is off-chip and coupled to processors via a communication fabric.

In light of the above, it is understandably faster to perform I/O operations in local volatile memory instead of in remote non-volatile memory when a network connection separates database-side processors from storage-side non-volatile memory. In the example of FIG. 1, each database server computer 100, 102 is remote from persistent storage 112, thereby exposing I/O performance times to network latency. To reduce such exposure, database server computers 100, 102 locally cache data received from storage server computer 104 in order to speed up performance of future I/O operations involving the data.

To further speed up performance of I/O operations, database server computers 100-102 may also be communicatively coupled to each other via an interconnect (not shown). An interconnect enables even faster performance of I/O operations based on "cache fusion" or transferring data directly between database-side caches. For example, a "dirty" data block may be transferred from database-side cache 106 to database-side cache 108 without the intervening step of writing the "dirty" data block to persistent storage 112. Cache fusion is described in detail in U.S. Pat. No. 6,353,836, titled "METHOD AND APPARATUS FOR TRANSFERRING DATA FROM THE CACHE OF ONE NODE TO THE CACHE OF ANOTHER NODE", issued on Mar. 5, 2002, the contents of which are incorporated herein by reference.

Storage Server Cache

Clustered database systems may also employ some form of caching at the storage-side. Storage server computer 104 may include persistent cache 110 and/or may be communicatively coupled to an external device that includes persistent cache 110. Like persistent storage 112, persistent cache 110 may comprise one or more storage devices that retain data in the absence of any electrical power. However, persistent cache 110 is typically a lower-latency storage medium relative to persistent storage 112. For example, persistent cache 110 may include one or more solid-state drives.

Persistent cache 110 may be used as a storage-side cache that backs database-side caches 106-108. Desired data may be absent from a database-side cache 106, 108 for various reasons, such as cache misses or hardware failures. However, when desired data is absent from a database-side cache 106, 108, storage server computer 104 may look for the data in persistent cache 110 before looking for the data in persistent storage 112. As mentioned above, performing I/O operations in persistent cache 110 is typically faster than performing I/O operations in persistent storage 112, so storage server computer 104 performs I/O operations in persistent cache 110 instead of persistent storage 112 whenever possible.

Typically, the data in any given database-side cache 106, 108 is likely replicated in persistent cache 110. As used herein, the term "inclusive" refers to such a relationship between persistent cache 110 and any given database-side cache 106, 108. To clarify what is meant by an "inclusive" cache, reference is made to the below.

Database-Side Cache
A B C D E
Storage-Side Cache
A B C D E F G H I J

Notably, each of Data Blocks A-E is stored in both the database-side cache and the storage-side cache.

However, persistent cache 110 is typically a higher-latency storage medium relative to volatile memory. For example, including round-trip messaging costs and context switch costs, performing I/O operations in flash memory may take about 250 microseconds, whereas performing I/O operations in volatile memory may take less than 100 microseconds. Furthermore, persistent cache 110 may be incompatible with certain techniques that reduce network-related latency costs. For example, remote direct memory access (RDMA) enables direct memory access from a memory region of one computer to a memory region of another computer without involving the operating systems of either computer, but persistent cache 110 is typically implemented as a device, not a memory region. In contrast, storage-side volatile memory is a memory region, so RDMA can be used to perform I/O operations in storage-side volatile memory less than 10 microseconds.

Thus, implementing a storage-side volatile memory cache would be desirable to enable even faster performance of I/O operations. In many cases, however, volatile memory at the storage-side is limited to a storage capacity that is smaller than that of any database-side cache. This prevents storage-side volatile memory from exhibiting an inclusive relationship with any database-side cache. To illustrate the problem, reference is made to the below.

Database-Side Cache
A B C D E
Storage-Side Cache
A B C

Notably, the storage-side cache has insufficient space for storing Data Blocks D-E. A storage-side cache implemented in this manner would be of little, if any, use, because a cache miss at the database-side would necessarily mean a cache miss at the storage-side.

Therefore, what is needed is a robust approach for using a storage-side volatile memory cache to enable faster performance of I/O operations even when the storage-side volatile memory cache has a smaller storage capacity than any database-side cache.

Figure 1:
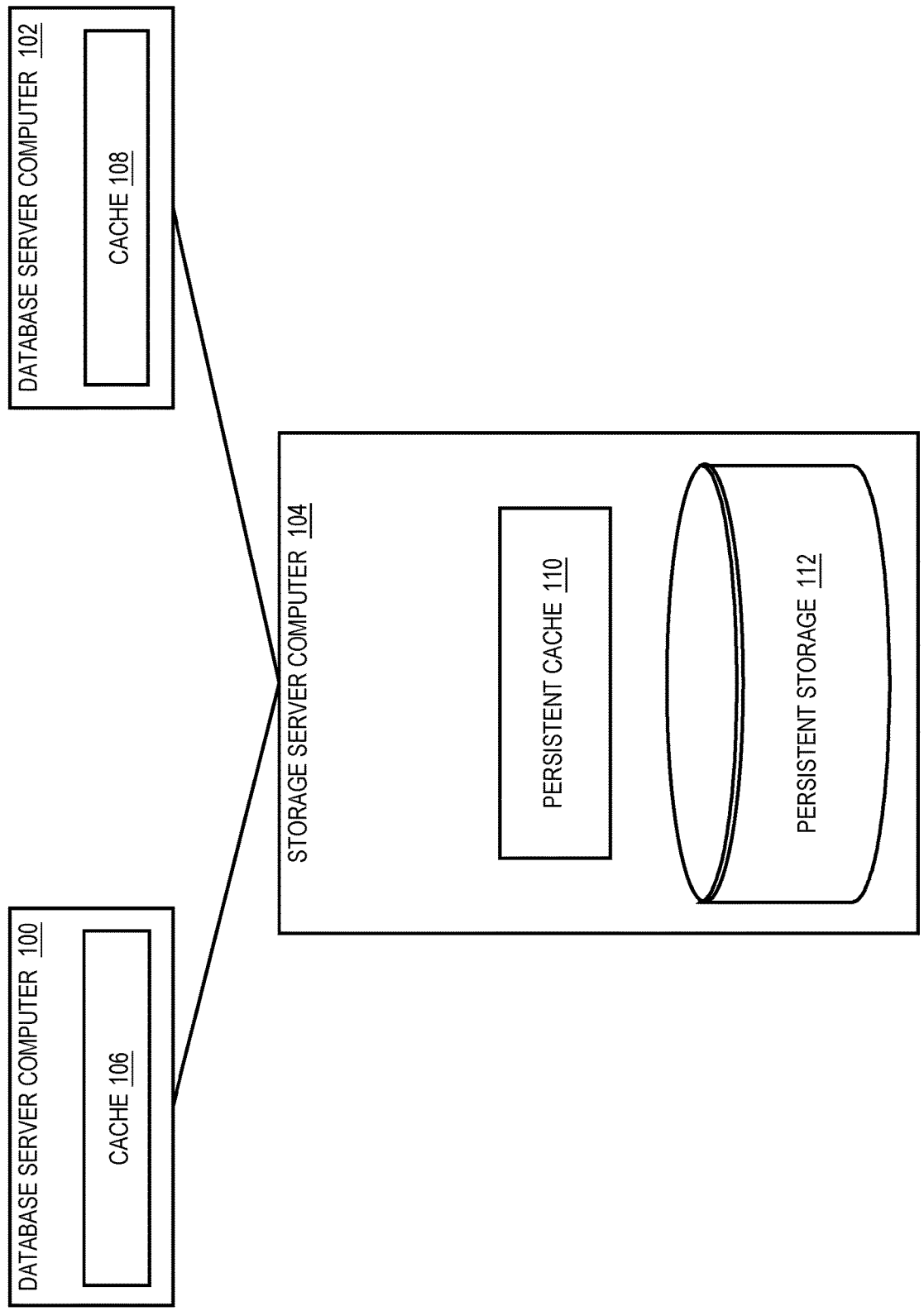
FIG. 1 depicts an example clustered database environment.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" are used to differentiate elements and do not necessarily indicate any particular order.

Introduction

Embodiments disclosed herein are related to a storage-side extension of database-side caches. Like the database-side caches, the storage-side extension is implemented as volatile memory that exhibits low latency and high I/O operations per second (IOPS). Although storage-side volatile memory operates much like a tail extension of any given database-side cache, in terms of a memory hierarchy, storage-side volatile memory can also be thought of as sitting below the database-side caches but above a storage-side persistent cache and a storage-side persistent storage.

Using storage-side volatile memory as a tail extension of a database-side cache avoids situations in which a cache miss at the database-side necessarily means a cache miss at the storage-side. This is true even if the storage-side volatile memory has a smaller storage capacity than any database-side cache, because the storage-side volatile memory should not have any duplicates of the data blocks stored in any of the database-side caches. In other words, the storage-side volatile memory is "exclusive" of any database-side cache.

As will be described in greater detail below, "exclusive" caches exhibit an either/or relationship in that any given data block may be stored either in Cache A or in Cache B, but not in both Cache A and Cache B. In general, at least several measures are used to achieve exclusivity. When the storage-side satisfies a read request from the database-side, the requested data block is stored in a database-side cache. However, if the requested data block was retrieved from the storage-side volatile cache, the requested data block is also evicted from the storage-side volatile cache. Conversely, when a clean data block is evicted from the database-side cache, the data block is responsively stored in the storage-side volatile cache.

Because the same data block is not stored in both the database-side and storage-side volatile caches, more data blocks may be stored collectively by the volatile caches. Thus, a request for a data block that results in a cache miss at the database-side may be satisfied by a cache hit at the storage-side. In some embodiments, "cold" data blocks in the tail end of a database-side volatile cache are evicted and then stored in the storage-side volatile cache, thereby causing the storage-side volatile cache to operate much like the "cold" end of a least recently used (LRU) and/or a least frequently use (LFU) cache having one or more database-side caches as its "hot" end.

Volatile Cache Extension

Figure 2:
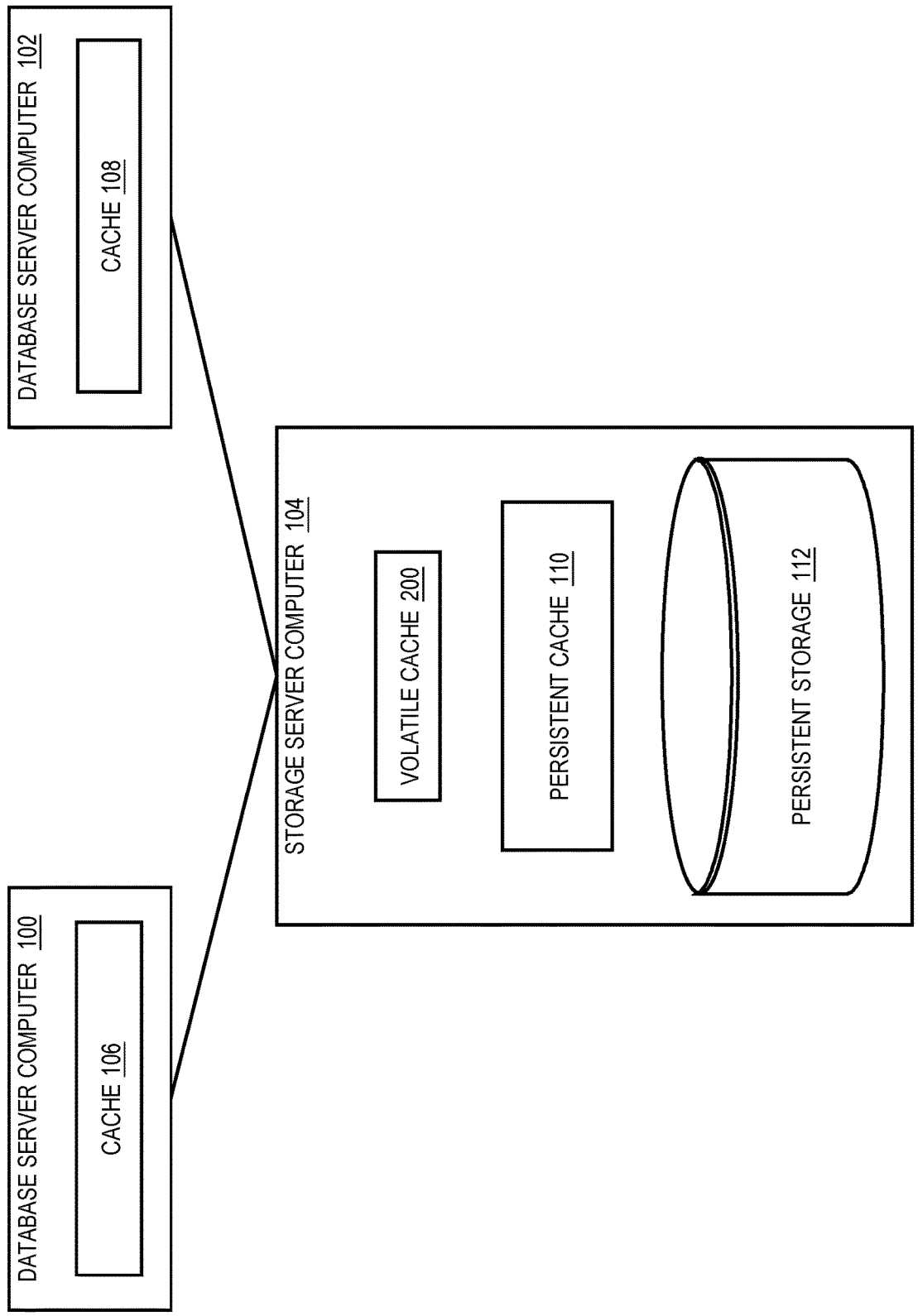
FIG. 2 depicts an example computer architecture on which embodiments may be implemented.

To achieve faster performance of I/O operations, database-side caches are augmented with storage-side volatile memory. Referring to FIG. 2, volatile cache 200 is implemented as volatile memory of storage server computer 104. As mentioned above, volatile memory provides lower latency and higher IOPS relative to non-volatile memory. Thus, when a cache miss occurs at the database-side, it would be more efficient to retrieve desired data from volatile cache 200 than from persistent cache 110 or persistent storage 112.

However, storage-side volatile memory often has a smaller storage capacity than any database-side cache. Indeed, this is the scenario depicted in FIG. 2, where volatile cache 200 has a smaller size than either cache 106 or cache 108. As such, volatile cache 200 cannot be "inclusive" of database-side cache 106 or 108. Accordingly, volatile cache 200 does not supplant persistent cache 110. Instead, volatile cache 200 is an additional cache layer that is hierarchically situated above persistent cache 110 but below database-side caches 106-108. Thus, volatile cache 200 is treated as storing a subset of the data in persistent cache 110 having a relatively high likelihood of being involved in an I/O operation. At the same time, volatile cache 200 can be thought of as storing data that is less likely to be involved in an I/O operation than any of the data stored in a database-side cache 106, 108

In other words, volatile cache 200 is "exclusive" of any given database-side cache 106, 108. To clarify what is meant by an "exclusive" cache, reference is made to the below.

Database-Side Cache
  A B C D E
Storage-Side Cache
  F G H

Notably, none of the data blocks stored in the database-side cache are also stored in the storage-side cache. If Data Block A is evicted from the database-side cache, Data Block A is stored in the storage-side cache. This may involve evicting Data Block F to make space available in the storage-side cache. Data blocks evicted from the storage-side cache are not necessarily stored in the database-side cache. In the preceding example, Data Block F would not be stored in the database-side cache. However, in response to a cache miss at the database-side cache for Data Block H, Data Block H would be evicted from the storage-side cache and stored in the database-side cache.

Stated in yet another way, volatile cache 200 can be thought of as an extension to database-side caches 106-108, where volatile cache 200 is the tail end of a single logical cache having database-side caches 106-108 at the head end. In a clustered database environment, database-side caches 106-108 collectively form the head end of the logical cache. For the sake of clarity and ease of explanation, however, reference is made to a logical cache comprising a single database-side cache 106, 108.

Figure 3:
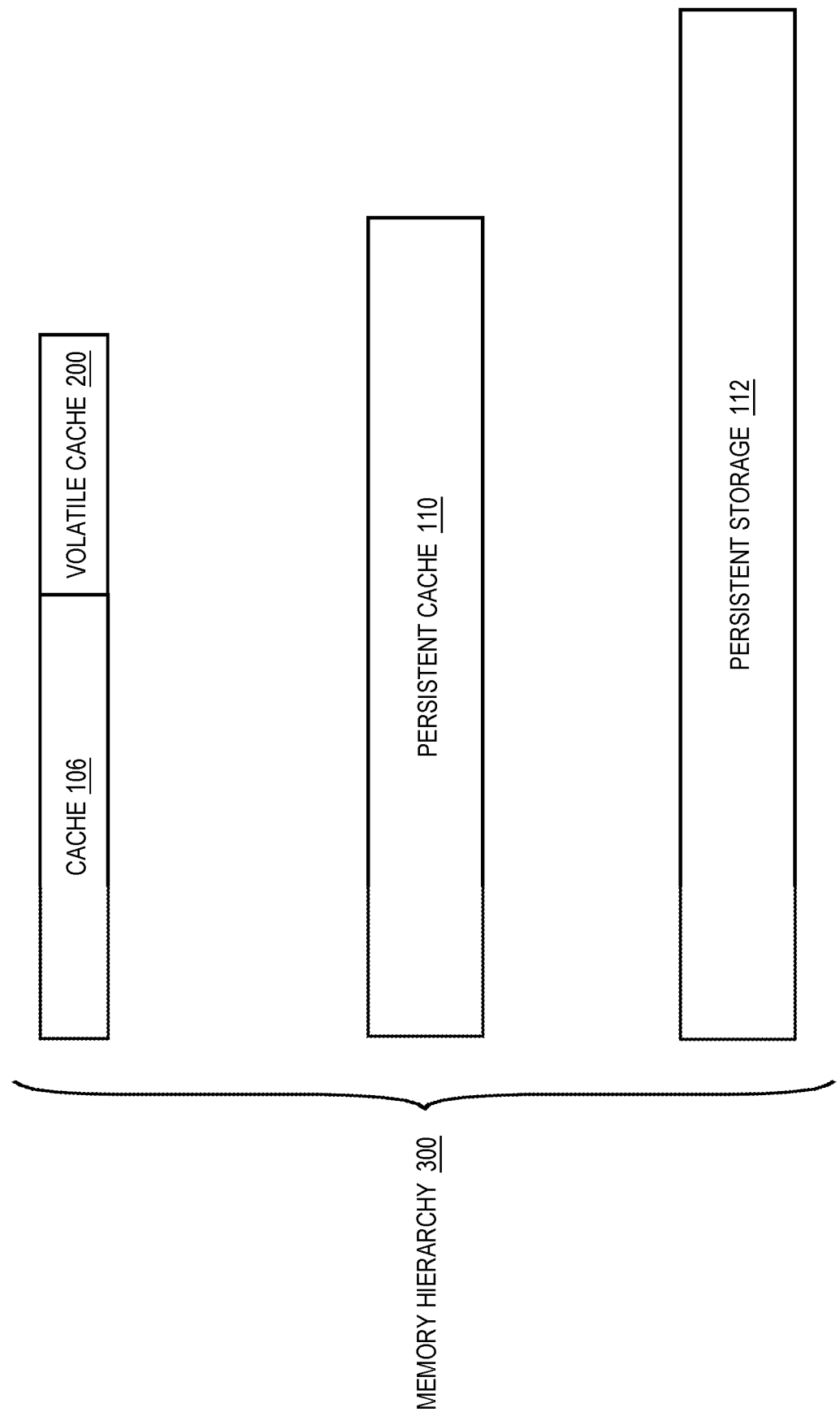
FIG. 3 depicts an example memory hierarchy.

Referring to FIG. 3, memory hierarchy 300 comprises a logical cache including database-side cache 106 at its "hot" or head end and volatile cache 200 at its "cold" or tail end. For example, the logical cache may be a LRU and/or LFU cache. Thus, the most recently and/or most frequently accessed data blocks of the logical cache are stored at the database-side, whereas the least recently and/or least frequently accessed data blocks of the logical cache are stored at the storage-side. However, database-side cache 106 and volatile cache 200 collectively operate as parts of the same cache. They exhibit an "exclusive" relationship, because it is unnecessary to store duplicates of data blocks within the same cache.

When the coldest data blocks of database-side cache 106 are evicted to free memory for more recently accessed data blocks, the evicted data blocks are moved to volatile cache 200 at the storage-side. A database server computer 100, 102 may track "hotness" or "coldness" based on access counts, access frequencies, and/or access times. When cache misses occur at database-side cache 106, data blocks that are read from storage-side volatile cache 200 are moved back to database-side cache 106. In a sense, the hottest data blocks of the storage-side volatile cache 200 are returned to the database-side. However, it is unnecessary to track "hotness" or "coldness" in volatile cache 200. For example, volatile cache 200 may be implemented much like a first in, first out (FIFO) queue.

In the example of FIG. 3, memory hierarchy 300 further comprises persistent cache 110 and persistent storage 112. Notably, persistent cache 110 is depicted as having a larger storage capacity than database-side cache 106 and volatile cache 200, alone or in combination. In turn, persistent storage 112 is depicted as having a larger storage capacity than persistent cache 110.

As mentioned above, persistent cache 110 is "inclusive" of database-side cache 106. Thus, persistent cache 110 is also "inclusive" of volatile cache 200. To maintain the "inclusive" relationship between persistent cache 110 and the logical cache comprising database-side cache 106 and volatile cache 200, the volatile cache 200 may be implemented as a "write-though" cache with respect to persistent cache 110. In other words, a data block written to storage server computer 104 is written to both volatile cache 200 and persistent cache 110 before completion of the write is confirmed. Accordingly, persistent cache 110 may be used as a backup source of data for the logical cache.

In some embodiments, writes are efficiently performed based on implementing persistent cache 110 as a "write-back" cache relative to persistent storage 112. Thus, when a data block is written to persistent cache 110, completion of the write is confirmed to the requestor of the write without waiting for the data block to also be written to persistent storage 112. The data block is later written to persistent storage 112 when the data block is evicted from persistent cache 110.

Eviction Notifications

Figure 4:
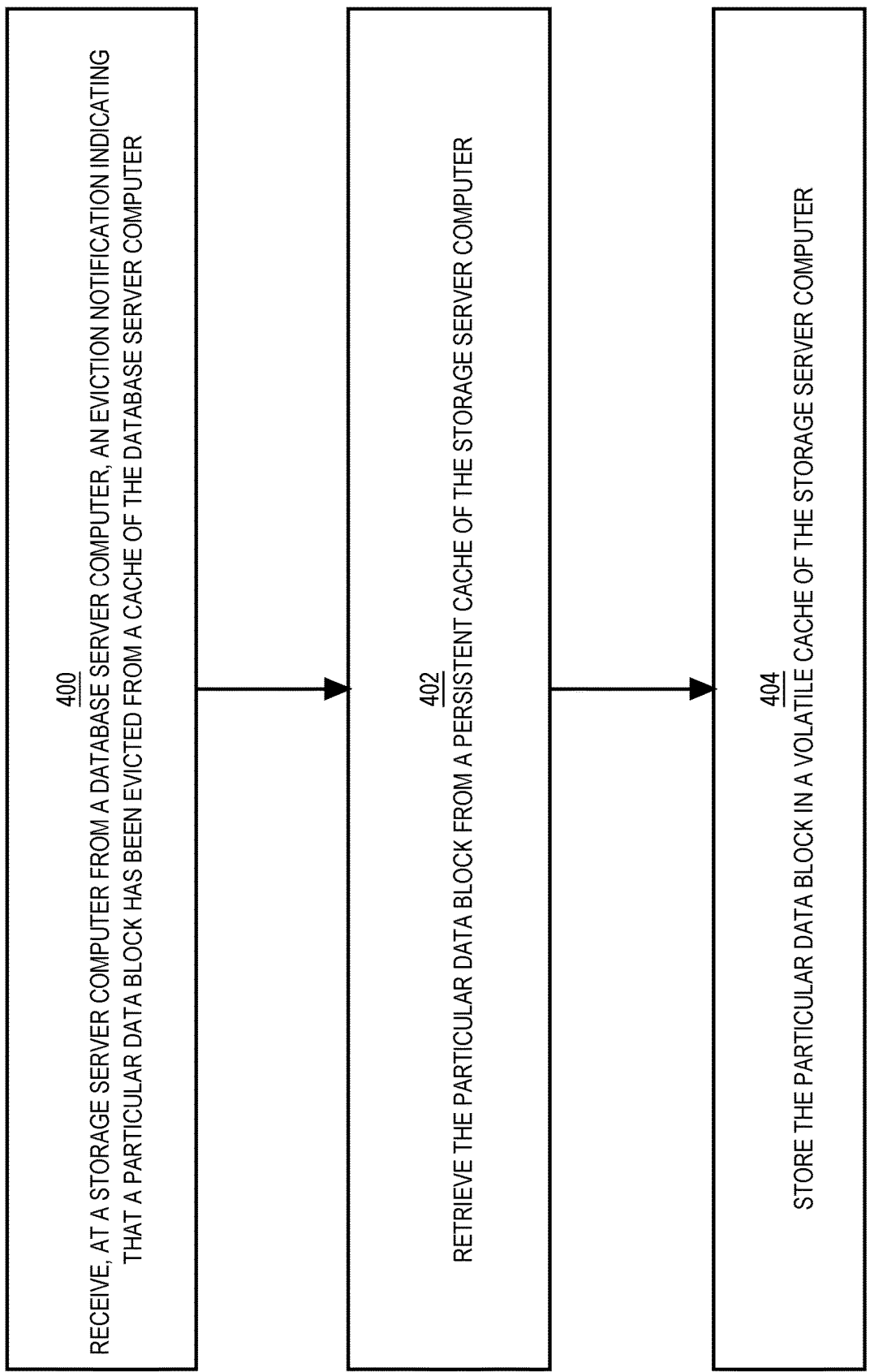
FIG. 4 depicts an example approach for responding to an eviction notification.

As mentioned above, clean data blocks are periodically evicted from database-side caches 106-108. As will be described in greater detail below, data blocks may be evicted in batches. However, for the sake of clarity and ease of explanation, FIG. 4 depicts an eviction process in terms of a single data block.

At block 400, storage server computer 104 receives an eviction notification from a database server computer 100, 102. The eviction notification indicates that a particular data block has been evicted from a database-side cache 106, 108.

Notably, storage server computer 104 receives the eviction notification instead of the evicted data block. Advantageously, fewer computing resources are involved in the transmission of an eviction notification as compared to the transmission of a data block, because an eviction notification comprises a smaller amount of data than a data block. Typically, an eviction notification comprises metadata that uniquely identifies a particular data block. For example, an eviction notification may comprise a disk number, an offset, and/or any other address of a particular data block in persistent storage 112.

As mentioned above, storage server computer 104 comprises memory hierarchy 300 that includes volatile cache 200 and persistent cache 110. At block 402, storage server computer 104 retrieves the particular data block from persistent cache 110 upon receiving the eviction notification. For example, storage server computer 104 may scan persistent cache 110 for a memory address corresponding to the disk address included in the eviction notification. Thereafter, storage server computer 104 may retrieve the data block stored in persistent cache 110 at the memory address. Notably, the particular data block should be in persistent cache 110, because persistent cache 110 is "inclusive" of the database-side cache 106, 108 from which the particular data block was evicted.

At block 404, storage server computer 104 stores the particular data block in volatile cache 200. At this point, the particular data block is stored in both volatile cache 200 and persistent cache 110, but not in database-side caches 106-108. Thus, persistent cache 110 remains "inclusive" of volatile cache 200 and database-side caches 106-108. Furthermore, volatile cache 200 remains "exclusive" of database-side caches 106-108.

Batch Evictions

As mentioned above, data blocks are evicted from database-side caches 106-108 in batches. This is to ensure that a data block is not stored in volatile cache 200 unless the data block has been evicted from all database-side caches 106-108. Otherwise, volatile cache 200 may not exhibit an "exclusive" relationship with database-side caches 106-108, because the data block evicted from one database-side cache may be accessible from another database-side cache via cache fusion, for example.

In a sense, volatile cache 200 is a consolidated extension of each of database-side caches 106-108. Unlike some other types of memory, however, volatile cache 200 is not hard partitioned for each of database-side caches 106-108. Rather, volatile cache 200 is flexibly partitioned such that each of database-side caches 106-108 can use as much or as little of volatile cache 200 as is necessary at any given point in time.

Accordingly, storage server computer 104 receives the eviction notification when the particular data block has been "globally" evicted from database-side caches 106-108. Global eviction refers to evicting a data block from one or more database-side caches 106-108 such that the data block is no longer stored in any of database-side caches 106-108. Until it is determined that the data block is no longer stored in any of database-side caches 106-108, storage server computer 104 does not receive the eviction notification. For example, database server computer 100 may make this determination based on communicating with database server computer 102 via an interconnect.

Read Requests

Figure 5:
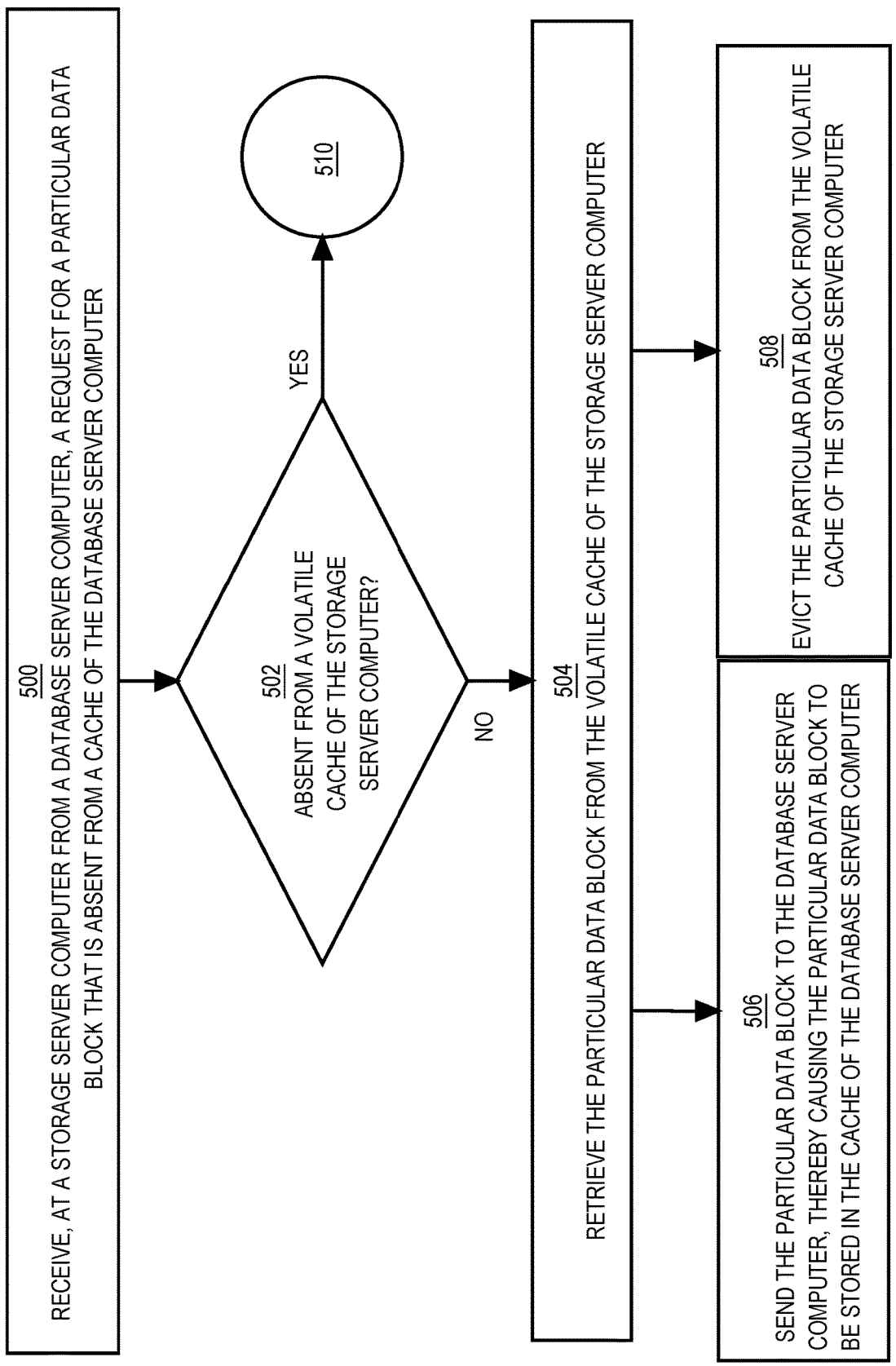
FIGS. 5-6 depict an example approach for responding to a read request.
Figure 6:
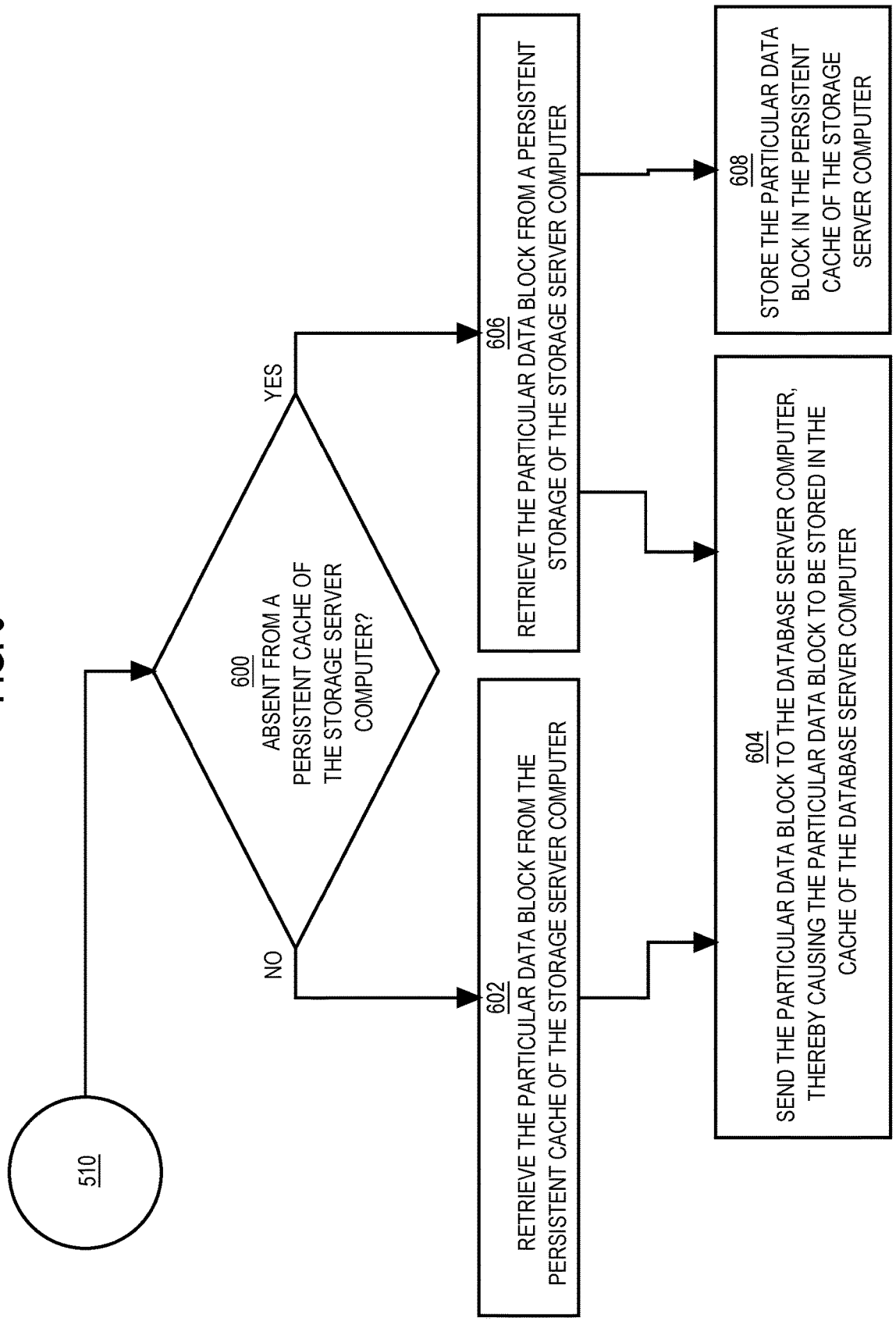

FIGS. 5-6 collectively depict a read process involving memory hierarchy 300. The read process is performed at the storage-side in response to a cache miss at the database-side.

At block 500, storage server computer 104 receives a request from a database server computer 100, 102. The request is for a particular data block that is absent from a database-side cache 106, 108. In embodiments implementing cache fusion, the request may be for a particular data block that is absent from all database-side caches 106-108.

At block 502, upon receiving the request, storage server computer 104 determines whether the particular data block is also absent from volatile cache 200. If storage server computer 104 determines that the particular data block is stored in a volatile cache, block 502 proceeds to block 504. Otherwise, block 502 proceeds to block 510.

At block 504, storage server computer 104 retrieves the particular data block from volatile cache 200. Block 504 proceeds to blocks 506-508, which may be performed in any order, including concurrently.

At block 506, storage server computer 104 sends the particular data block to the database server computer 100, 102 that originated the request. This causes the particular data block to be stored in a cache 106, 108 of the database server computer 100, 102. In a sense, the particular data block has been returned to the "hot" end of a logical cache comprising database-side caches 106-108 and storage-side volatile cache 200.

At block 508, storage server computer 104 evicts the particular data block from volatile cache 200. Doing so maintains the "exclusive" relationship between volatile cache 200 and database-side caches 106-108.

Block 510 connects FIG. 5 to FIG. 6. Block 510 proceeds to block 600 of FIG. 6. FIG. 6 depicts the read process after storage server computer 104 determines that the particular data block is absent from volatile cache 200.

At block 600, storage server computer 104 determines whether the particular data block is stored in persistent cache 110. If storage server computer 104 determines that the particular data block is stored in persistent cache 110, block 600 proceeds to block 602. Otherwise, block 600 proceeds to block 604.

At block 602, storage server computer 104 retrieves the particular data block from persistent cache 110. As mentioned above, the set of data in persistent cache 110 is "inclusive" of the set of data in a logical cache comprising volatile cache 200 and database-side caches 106-108. Thus, persistent cache 110 may store data that is absent from the logical cache.

At block 604, storage server computer 104 sends the particular data block to the database server computer 100, 102 that originated the request. This causes the particular data block to be stored in a cache 106, 108 of the database server computer 100, 102.

At block 606, storage server computer 104 retrieves the particular data block from persistent storage 112 upon determining that the particular data block is absent from persistent cache 110. Block 606 proceeds to blocks 604 and 608, which can be performed in any order, including concurrently.

At block 608, storage server computer 104 stores the particular data block in persistent cache 110. This ensures that persistent cache 110 remains "inclusive" of database-side caches 106-108.

RDMA Read Requests

Typically, I/O operations are performed using a two-way messaging approach for inter-process communications involving an "initiator" process and a "responder" process. For example, if database server computer 100 wishes to read a data block stored in persistent cache 110, an initiator process of database server computer 100 contacts a responder process of storage server computer 104 with a request for the data block. The responder process wakes up, issues a request for the data block to persistent cache 110, obtains the data block from persistent cache 110, and sends the data block to the initiator process. Then, the initiator process wakes up, receives the data block, and acknowledges completion of the read. Notably, the number of messages passed makes this approach compute-intensive. Furthermore, this approach is slowed by the exposure of each message to network latency.

RDMA is a more efficient option for reading data blocks from a memory region, such as volatile cache 200, of a host computer. As used herein, a memory region excludes storage devices and other forms of memory that are not directly addressable by the host computer's processors. RDMA involves the responder process pre-registering a memory region with a host channel adapter (HCA), which is a network card at the network interface controller (NIC). The responder process then sends, to the initiator process, a hash table and a key for the memory region. The hash table is a mapping of cache lines in the memory region and can be probed to determine a hit or miss in particular cache lines. The key enables the initiator process to directly access particular cache lines without contacting the responder process. Thus, the initiator process just communicates with the HCA, which performs the read operation.

Write Requests

Figure 7:
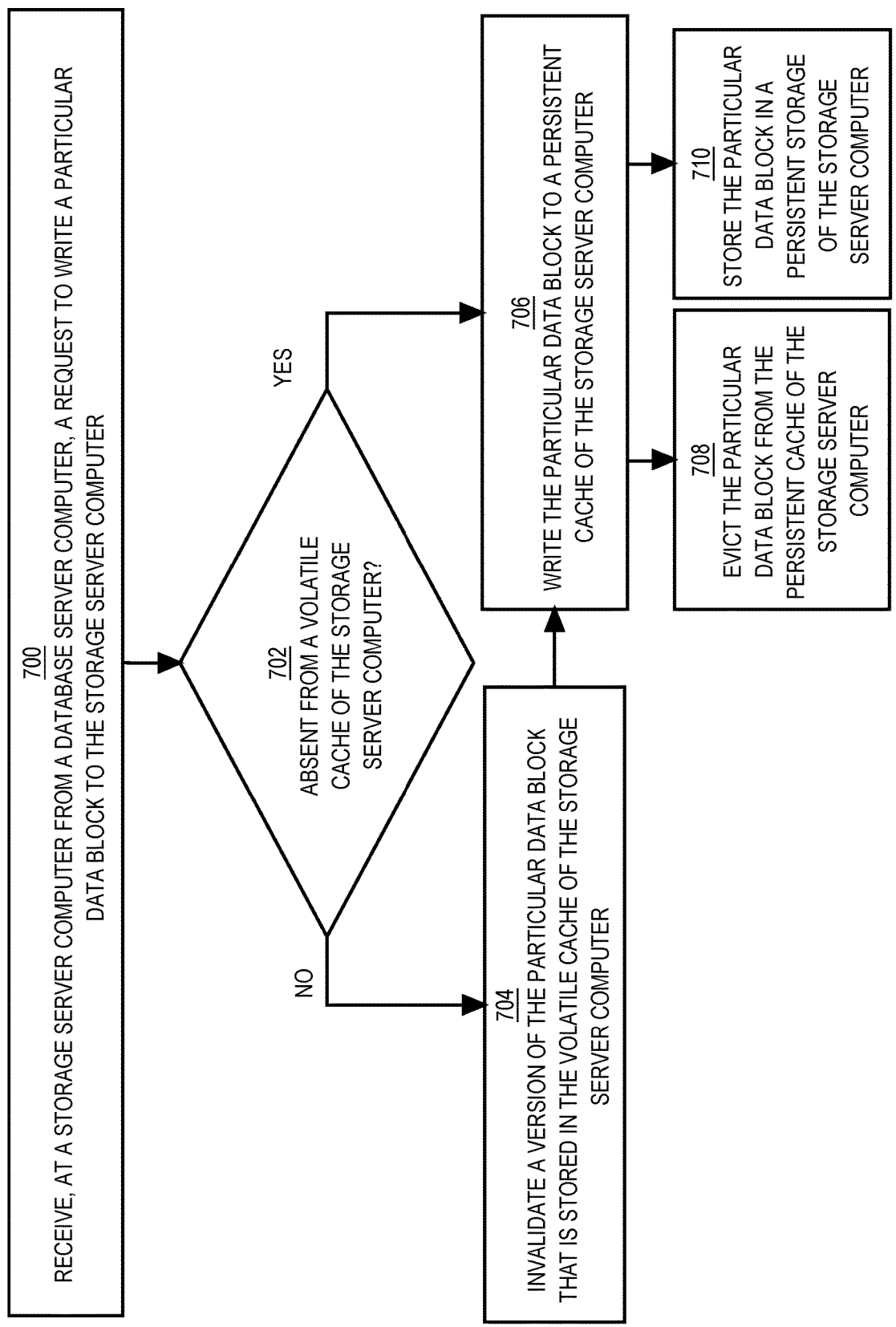
FIG. 7 depicts an example approach for responding to a write request.

FIG. 7 depicts a write process involving memory hierarchy 300. A write process is typically performed to convert "dirty" data blocks into "clean" data blocks. In general, "dirty" data blocks cannot be evicted from a database-side cache 106, 108 without first having been written to persistent storage 112; however, "clean" data blocks can be immediately evicted from a database-side cache 106, 108. Typically, "clean" data blocks are evicted from the "cold" end of a database-side cache 106, 108.

At block 700, storage server computer 104 receives a request from a database server computer 100, 102. The request specifies that a particular data block is to be written to storage server computer 104.

At block 702, upon receiving the request, storage server computer 104 determines whether the particular data block is absent from volatile cache 200. Usually, block 702 results in a determination that the particular data block is absent from volatile cache 200. This is because the "exclusive" relationship between volatile cache 200 and database-side caches 106-108 generally calls for the particular data block to be absent from volatile cache 200 when the particular data block is stored in a database-side cache 106, 108. However, under some circumstances, different versions of the particular data block may be stored in both volatile cache 200 and a database-side cache 106, 108. If the particular data block is stored in volatile cache 200, block 702 proceeds to block 704. Otherwise, block 702 proceeds to block 706.

At block 704, storage server computer 104 invalidates a version of the particular data block that is stored in volatile cache 200. For example, the version stored in volatile cache 200 may be a previous version of the particular data block. The database-side may have a different version from the storage-side, because eviction notifications are not transmitted when a database object is dropped or shrunken. Block 704 proceeds to block 706.

At block 706, storage server computer 104 writes the particular data block to persistent cache 110. If another version of the particular data block is stored in persistent cache 110, the different version is updated or overwritten.

Block 706 proceeds to blocks 708-710, which can be performed in any order, including concurrently. Blocks 708-710 are related to a "write-back" cache implementation of persistent cache 110. Thus, blocks 708-710 are performed after a particular data block is written to persistent cache 110.

At block 708, storage server computer 104 evicts the particular data block from persistent cache 110. The particular data block may be evicted as a result of performing cache management.

At block 710, storage server computer 104 stores the particular data block in persistent storage 112. Deferring writes to persistent storage 112 by treating persistent cache 110 as a write-back cache reduces write latency attributable to disk I/O, seek times, and/or the like.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
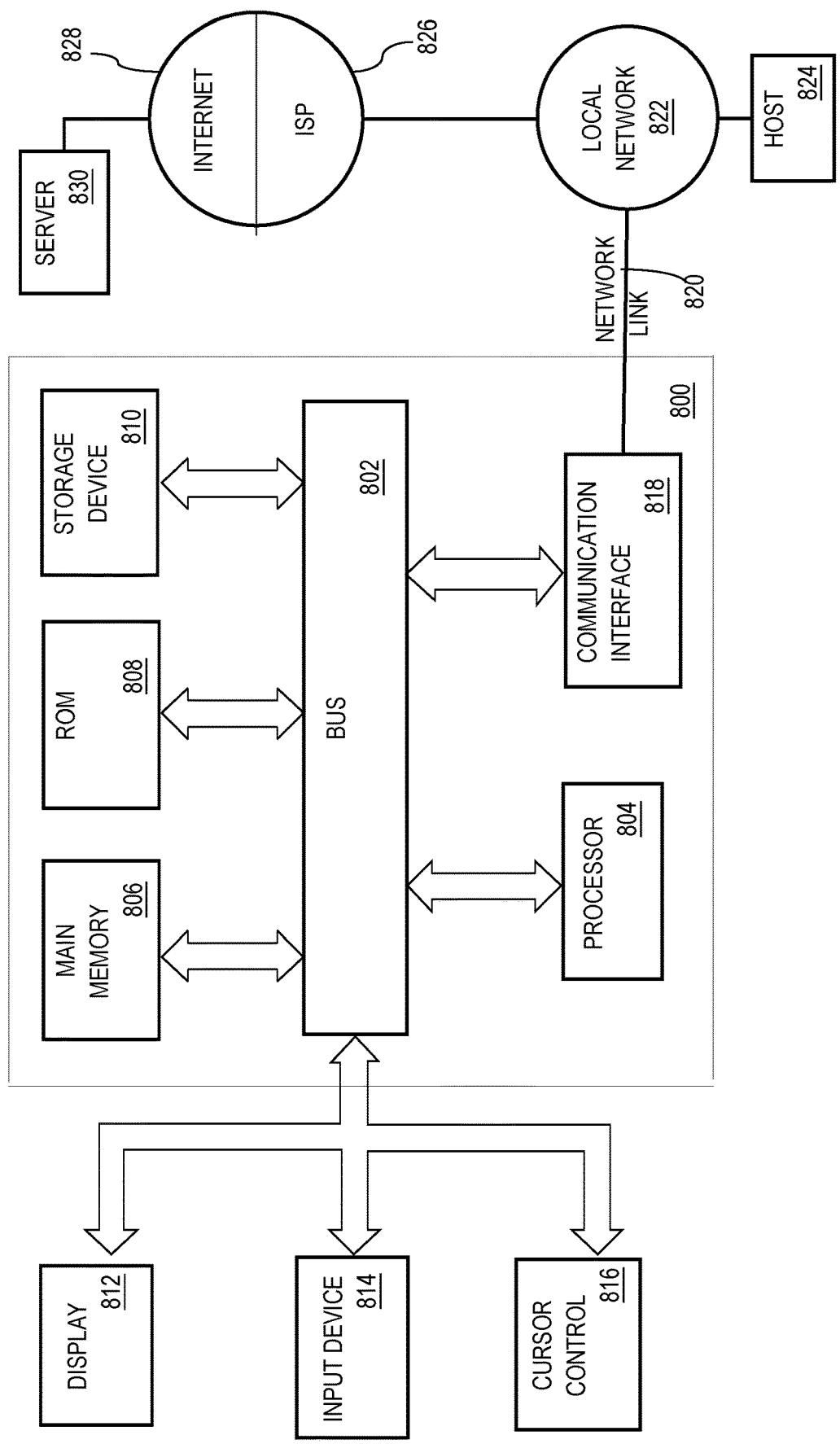
FIG. 8 depicts a computer system upon which embodiments may be implemented.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
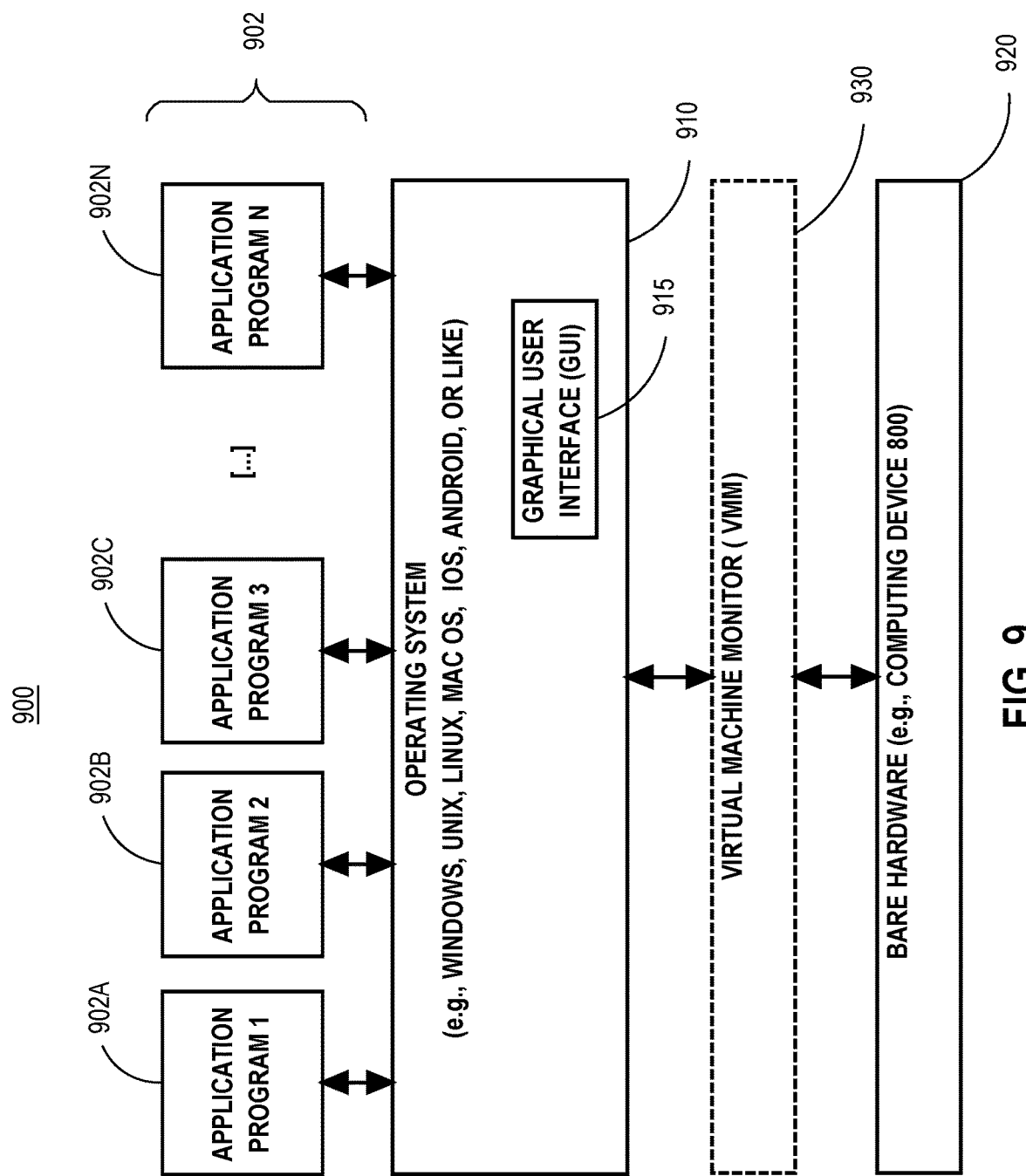
FIG. 9 depicts a software system for controlling the operation of the computer system.

FIG. 9 is a block diagram of a software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 800. The applications or other software intended for use on system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of system 900. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Extensions and Alternatives

In the foregoing specification, embodiments of the disclosure have been described with reference to numerous specific details that may vary from implementation to implementation. The specification and drawings are, accordingly, to be regarded in an illustrative rather than a restrictive

What is claimed is:

1. A method comprising:
receiving a request from a database server computer to write a first data block to a storage server computer, wherein said storage server computer is connected to said database server via a network, wherein said storage server computer comprises a memory hierarchy including a volatile cache and a persistent cache;
upon receiving said request:
invalidating any version of said first data block that is stored in said volatile cache of said storage server computer, and
writing said first data block to said persistent cache of said storage server computer;
after said invalidating and writing said first data block to said persistent cache, receiving over said network, at the storage server computer from said database server, an eviction notification indicating that said first data block has been evicted from a cache of said database server computer;
upon receiving said eviction notification:
retrieving said first data block from said persistent cache of said storage server computer;
storing said first data block in said volatile cache of said storage server computer; and
after receiving said eviction notification, receiving, at said storage server computer from said database server computer, a request for said first data block; and
upon receiving said request for said first data block:
retrieving said first data block from said volatile cache of said storage server computer;
sending said first data block to said database server computer, thereby causing said first data block to be stored in said cache of said database server computer; and
evicting said first data block from said volatile cache of said storage server computer.

2. The method of claim 1, wherein said volatile cache of said storage server computer has a smaller storage capacity than said cache of said database server computer.

3. The method of claim 1, wherein said storage server computer further comprises a persistent storage that backs said volatile cache and said persistent cache, and wherein said eviction notification comprises an address of said first data block in said persistent storage.

4. The method of claim 1, wherein said database server computer is one of a plurality of database server computers that share said storage server computer, and wherein said eviction notification is received once said first data block has been evicted from a plurality of caches of said plurality of database server computers.

5. The method of claim 1, wherein said request is a remote direct memory access (RDMA) request.

6. The method of claim 1, further comprising:
receiving, at said storage server computer from said database server computer, a request for a second data block that is absent from said cache of said database server computer;
upon receiving said request for a second data block, determining that said second data block is absent from said volatile cache of said storage server computer;
after determining that said second data block is absent from said volatile cache of said storage server computer, determining whether said second data block is stored in said persistent cache of said storage server computer.

7. The method of claim 6, further comprising, upon determining that said second data block is stored in said persistent cache of said storage server computer:
retrieving said second data block from said persistent cache of said storage server computer;
sending said second data block to said database server computer, thereby causing said second data block to be stored in said cache of said database server computer.

8. The method of claim 6, further comprising, upon determining that said second data block is absent from said persistent cache of said storage server computer:
retrieving said second data block from a persistent storage of said storage server computer, wherein said persistent storage backs said volatile cache and said persistent cache;
storing said second data block in said persistent cache of said storage server computer;
sending said second data block to said database server computer, thereby causing said second data block to be stored in said cache of said database server computer.

9. The method of claim 1, wherein prior to receiving said request to write said first data block to said storage server computer, said first data block is transferred directly to said cache of said database server computer from a cache of another database server computer.

10. One or more non-transitory storage media storing one or more sequences of instructions which, when executed by one or more computing devices, cause:
receiving a request from a database server computer to write a first data block to a storage server computer, wherein said storage server computer is connected to said database server via a network, wherein said storage server computer comprises a memory hierarchy including a volatile cache and a persistent cache;
upon receiving said request:
invalidating any version of said first data block that is stored in said volatile cache of said storage server computer, and
writing said first data block to said persistent cache of said storage server computer;
after said invalidating and writing said first data block to said persistent cache, receiving over said network, at the storage server computer from said database server, an eviction notification indicating that said first data block has been evicted from a cache of said database server computer;
upon receiving said eviction notification:
retrieving said first data block from said persistent cache of said storage server computer;
storing said first data block in said volatile cache of said storage server computer; and
after receiving said eviction notification, receiving, at said storage server computer from said database server computer, a request for said first data block; and
upon receiving said request for said first data block:
retrieving said first data block from said volatile cache of said storage server computer;
sending said first data block to said database server computer, thereby causing said first data block to be stored in said cache of said database server computer; and evicting said first data block from said volatile cache of said storage server computer.

11. The one or more non-transitory storage media of claim 10, wherein said volatile cache of said storage server computer has a smaller storage capacity than said cache of said database server computer.

12. The one or more non-transitory storage media of claim 10, wherein said storage server computer further comprises a persistent storage that backs said volatile cache and said persistent cache, and wherein said eviction notification comprises an address of said first data block in said persistent storage.

13. The one or more non-transitory storage media of claim 10, wherein said database server computer is one of a plurality of database server computers that share said storage server computer, and wherein said eviction notification is received once said first data block has been evicted from a plurality of caches of said plurality of database server computers.

14. The one or more non-transitory storage media of claim 10, wherein said request is a remote direct memory access (RDMA) request.

15. The one or more non-transitory storage media of claim 10, wherein said one or more sequences of instructions further comprise instructions which, when executed by said one or more computing devices, cause:
  receiving, at said storage server computer from said database server computer, a request for a second data block that is absent from said cache of said database server computer;
  upon receiving said request for a second da block, determining that said second data block is absent from said volatile cache of said storage server computer;
  after determining that said second data block is absent from said volatile cache of said storage server computer, determining whether said second data block is stored in said persistent cache of said storage server computer.

16. The one or more non-transitory storage media of claim 15, wherein said one or more sequences of instructions further comprise instructions which, when executed by said one or more computing devices, cause, upon determining that said second data block is stored in said persistent cache of said storage server computer:
  retrieving said second data block from said persistent cache of said storage server computer;
  sending said second data block to said database server computer, thereby causing said second data block to be stored in said cache of said database server computer.

17. The one or more non-transitory storage media of claim 15, wherein said one or more sequences of instructions further comprise instructions which, when executed by said one or more computing devices, cause, upon determining that said second data block is absent from said persistent cache of said storage server computer:
  retrieving said second data block from a persistent storage of said storage server computer, wherein said persistent storage backs said volatile cache and said persistent cache;
  storing said second data block in said persistent cache of said storage server computer;
  sending said second data block to said database server computer, thereby causing said second data block to be stored in said cache of said database server computer.

18. The one or more non-transitory storage media of claim 10, wherein prior to receiving said request to write said first data block to said storage server computer, said first data block is transferred directly to said cache of said database server computer from a cache of another database server computer.

* * * * *

UNITED STATES PATENT AND TRADEMARK OFFICE
CERTIFICATE OF CORRECTION

PATENT NO. : 11,327,887 B2
APPLICATION NO. : 15/705166
DATED : May 10, 2022
INVENTOR(S) : Shi et al.

It is certified that error appears in the above-identified patent and that said Letters Patent is hereby corrected as shown below:

In the Claims

In Column 17, Line 32, in Claim 15, delete "da block," and insert -- data block, --, therefor.

Signed and Sealed this
Sixteenth Day of August, 2022

Katherine Kelly Vidal
*Director of the United States Patent and Trademark Office*